(12) United States Patent
Storms, Jr. et al.

(10) Patent No.: US 9,120,575 B1
(45) Date of Patent: Sep. 1, 2015

(54) JUMPABLE PACK

(75) Inventors: Frederick W. Storms, Jr., Newport News, VA (US); David M. Jones, Virginia Beach, VA (US); Eric M. Yeates, Virginia Beach, VA (US)

(73) Assignee: Vista Outdoor Operations LLC, Clearfield, UT (US)

( * ) Notice: Subject to any disclaimer, the term of this patent is extended or adjusted under 35 U.S.C. 154(b) by 886 days.

(21) Appl. No.: 12/931,133

(22) Filed: Jan. 25, 2011

Related U.S. Application Data

(60) Provisional application No. 61/336,689, filed on Jan. 25, 2010.

(51) Int. Cl.
*B64D 17/40* (2006.01)

(52) U.S. Cl.
CPC ...................... *B64D 17/40* (2013.01)

(58) Field of Classification Search
CPC ........ B64D 17/30; B64D 17/38; B64D 17/40; B64D 17/52; B64D 2700/625; B64D 2700/62543
USPC .......... 244/147–148, 151 B, 151 R; 224/627, 224/661; 182/3, 6
See application file for complete search history.

(56) References Cited

U.S. PATENT DOCUMENTS

| | | | | |
|---|---|---|---|---|
| 1,871,223 A * | 8/1932 | Reese | ............................ | 224/648 |
| 1,909,158 A * | 5/1933 | Albihn | ............................ | 244/147 |
| 2,011,520 A * | 8/1935 | Kuhlemann | ............... | 244/151 R |
| 2,289,372 A * | 7/1942 | Manson et al. | ............ | 244/151 R |
| 2,316,896 A * | 4/1943 | Smith | ............................ | 244/148 |
| 2,375,655 A * | 5/1945 | Irvin | ............................... | 224/576 |
| 2,384,651 A * | 9/1945 | Smith | ............................ | 244/149 |
| 2,398,692 A * | 4/1946 | Bratz | ............................ | 244/149 |
| 2,556,923 A * | 6/1951 | Irvin | ............................ | 244/151 R |
| 2,819,830 A * | 1/1958 | Murray | .......................... | 224/578 |
| 3,018,074 A * | 1/1962 | Quilter | ............................ | 244/147 |
| 3,690,604 A * | 9/1972 | Guilfoyle | ........................ | 244/148 |
| 5,205,672 A * | 4/1993 | Stinton | ........................... | 405/186 |
| 6,164,509 A * | 12/2000 | Gausling et al. | ............... | 224/627 |
| 6,431,495 B1 * | 8/2002 | Lawyer | ............................ | 244/149 |
| 6,626,400 B1 * | 9/2003 | Booth | ............................ | 244/149 |
| 7,374,071 B2 * | 5/2008 | Lavelle | .......................... | 224/153 |
| 8,074,934 B2 * | 12/2011 | Fradet | ............................ | 244/147 |
| 8,434,722 B2 * | 5/2013 | Fradet | ............................ | 244/148 |
| 8,814,020 B2 * | 8/2014 | Yaeger et al. | .................. | 224/665 |
| 8,918,967 B2 * | 12/2014 | Berge | ............................... | 24/323 |
| 2009/0173763 A1 * | 7/2009 | Bridgeman | .................... | 224/674 |
| 2011/0168846 A1 * | 7/2011 | Strong | ........................... | 244/148 |

* cited by examiner

*Primary Examiner* — J. Gregory Pickett
*Assistant Examiner* — John Cogill
(74) *Attorney, Agent, or Firm* — Shaddock Law Group, PC

(57) ABSTRACT

A jumpable pack having a quick release attachment area; a pair of harness attachment loops secured to said pack within said quick release attachment area; a pair of connection loops secured to said pack within said quick release attachment area; a pair of release loops secured to said pack within said quick release attachment area; shoulder straps releasably secured to said pack; a pair of leg straps, wherein each leg strap is secured to said pack; a pair of leg strap attachment segments, wherein each leg strap attachment segment is releasably secured, via a leg strap attachment segment coupler, to each leg strap, and wherein each leg strap attachment segment includes an aperture formed proximate an end of said leg strap attachment segment; and a single point release assembly, wherein said single point release assembly includes a release line attached to a handle portion.

20 Claims, 15 Drawing Sheets

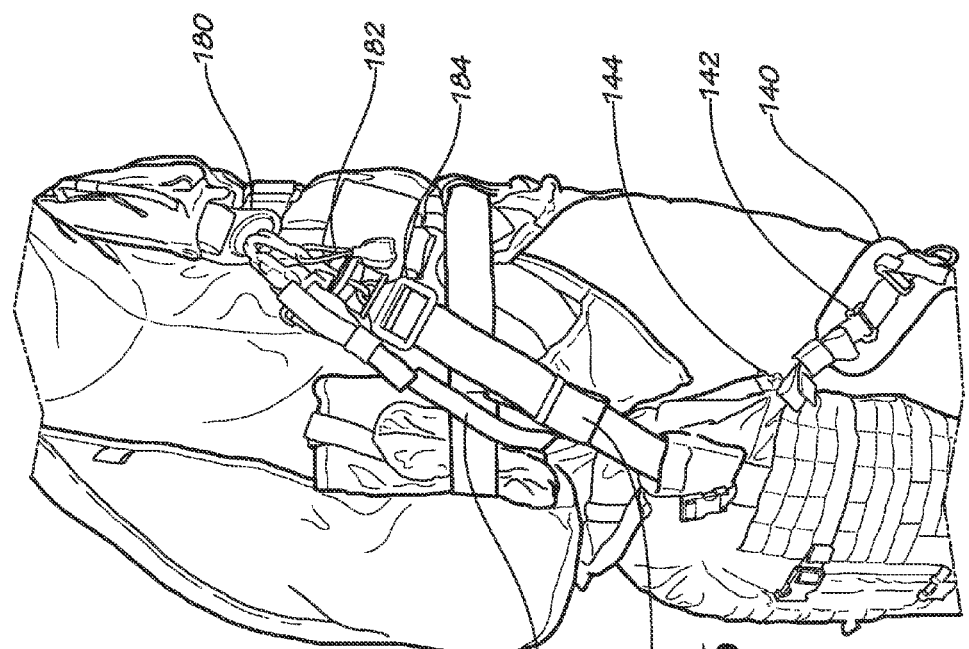
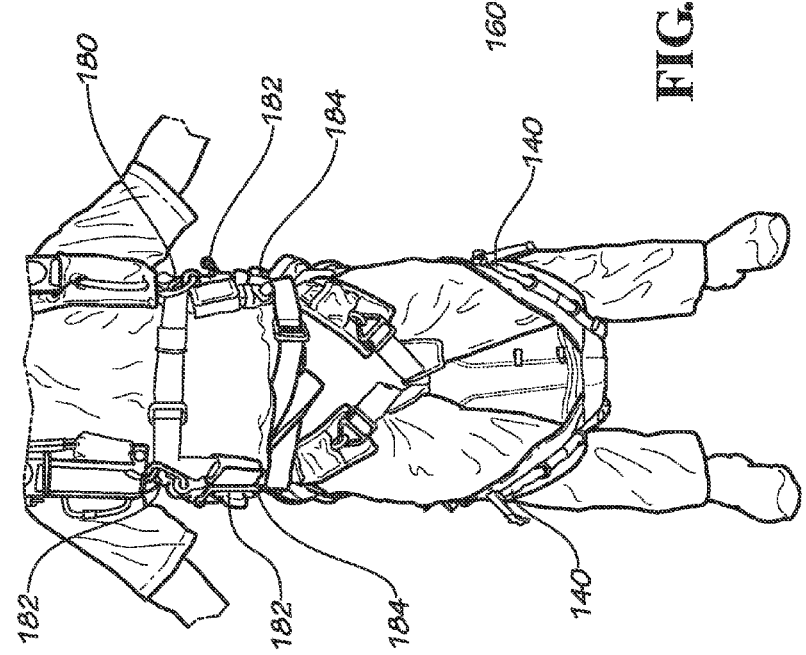
FIG. 25
FIG. 26

JUMPABLE PACK

CROSS-REFERENCE TO RELATED APPLICATIONS

This patent application claims the benefit of U.S. Patent Application Ser. No. 61/336,689, filed Jan. 25, 2010, the entire disclosure of which is incorporated herein by reference.

BACKGROUND OF THE INVENTION

1. Field of the Invention

This invention relates generally to jumpable packs or jump packs. In particular, the present invention relates to a jumpable pack that can be used in a number of jump configurations.

2. Description of Related Art

There are basically two methods used in parachuting from an aircraft, a static line method and a freefall method. When performing a static line jump, the parachutist attaches a static line to a transport aircraft and, when the parachutist jumps from the plane, the static line will deploy the parachutist's main canopy. In freefall jumping, the parachutist jumps from the transport aircraft and free falls for a period of time, before opening his or her parachute.

Particularly in military applications, parachutists' jump with a load-out of gear and equipment stowed in a jump bag.

Known jump bags are jump-type specific and jump bags designed to be used in static line jumps are different from jump bags designed to be used in freefall jumps.

SUMMARY OF THE INVENTION

The present invention relates generally to jumpable packs or jump packs. In particular, the present invention relates to a jumpable pack that can be used in a number of jump configurations and can be used in both static line and freefall jump applications.

In an illustrative, non-limiting embodiment of this invention, the jump pack comprises a pack having a reinforced quick-release attachment system that allows the jump pack can be utilized in either static line are freefall jump applications.

The quick-release attachment system utilizes specifically positioned harness attachment loops, connection loops, release loops, a drop line attachment loop, shoulder straps, leg straps, leg strap guides, leg strap attachment segments, and a single point release assembly.

In a static line application, the jump pack's harness attachment loops, connection loops, release loops, drop line attachment loop, leg straps, leg strap guides, leg strap attachment segments, and single point release assembly portions of the quick-release attachment system are used to attach the jump pack to the parachutist or the parachute harness.

In a freefall application, the jump pack's harness attachment loops, connection loops, release loops, drop line attachment loop, shoulder straps, leg straps, leg strap guides, leg strap attachment segments, and single point release assembly portions of the quick-release attachment system are used to attach the jump pack to the parachutist or the parachute harness.

Accordingly, this invention provides a jump pack having a multifunction quick-release attachment system.

This invention separately provides a quick-release jump pack.

This invention separately provides a jump pack having a quick-release attachment system, which is capable of being used in static line jumps.

This invention separately provides a jump pack having a quick-release attachment system, which is capable of being used in freefall jumps.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein:

FIG. 25 generally shows a front view of a first exemplary embodiment of a jump pack being used in a second freefall jump configuration according to this invention, where in the jump pack is attached to a parachutist and the parachute harness;

FIG. 26 generally shows a right side view of a first exemplary embodiment of a jump pack being used in a second freefall jump configuration according to this invention, where in the jump pack is attached to the parachutist and the parachute harness.

DETAILED DESCRIPTION OF EXEMPLARY EMBODIMENTS

Figure 2:
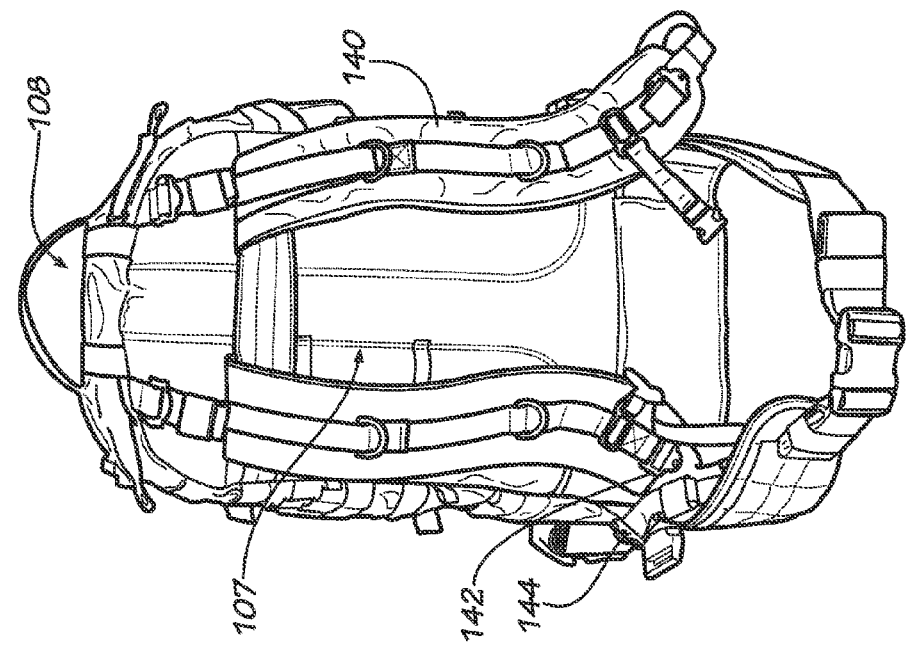
FIG. 2 generally shows a back view of a first exemplary embodiment of a jump pack according to this invention.
Figure 1:
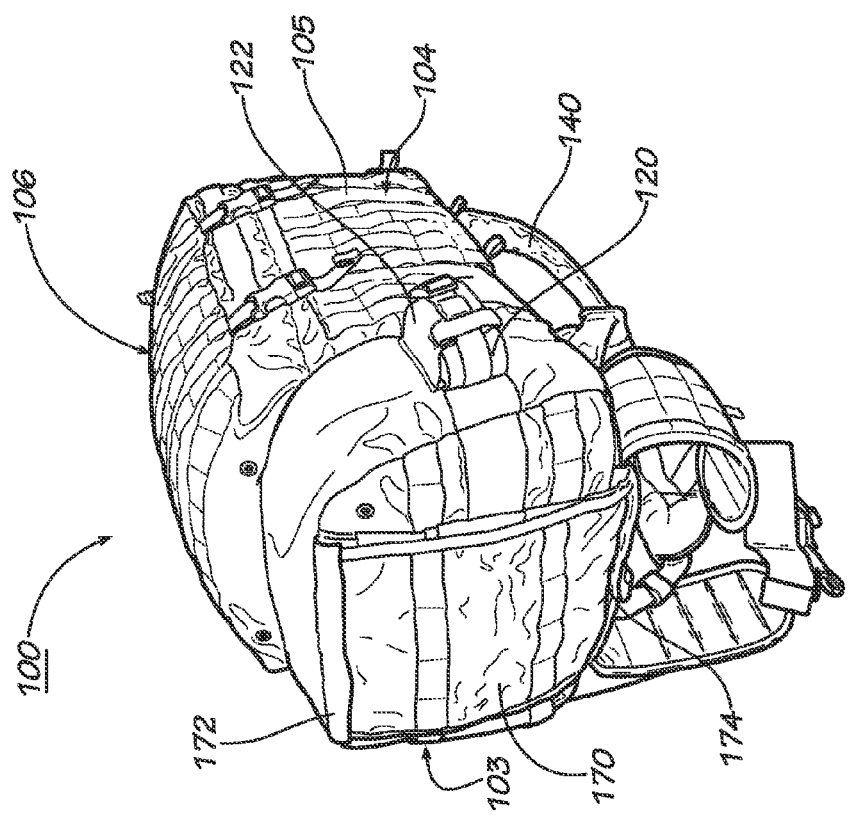
FIG. 1 generally shows a bottom perspective view of a first exemplary embodiment of a jump pack according to this invention.
Figure 3:
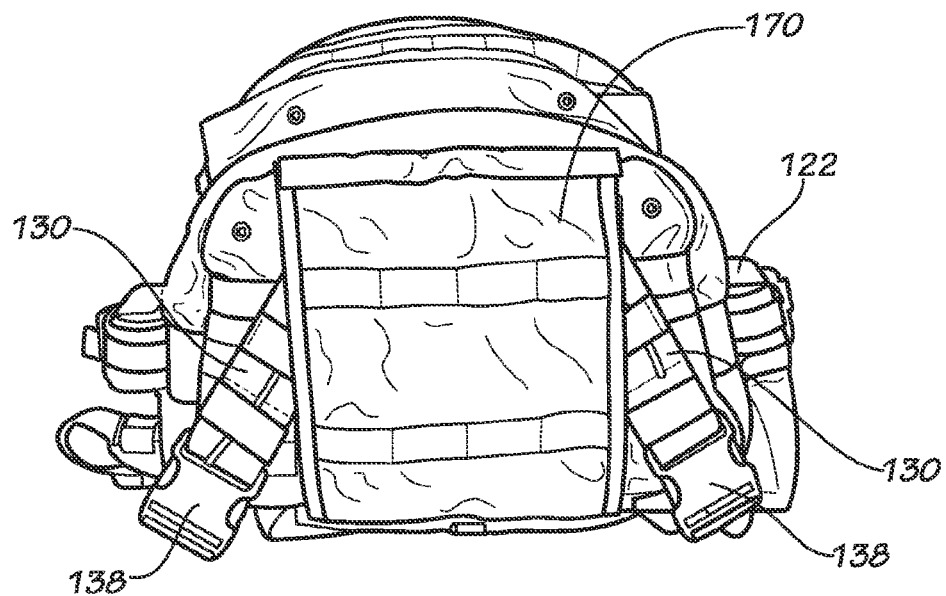
FIG. 3 generally shows a bottom view of a first exemplary embodiment of a jump pack according to this invention.
Figure 4:
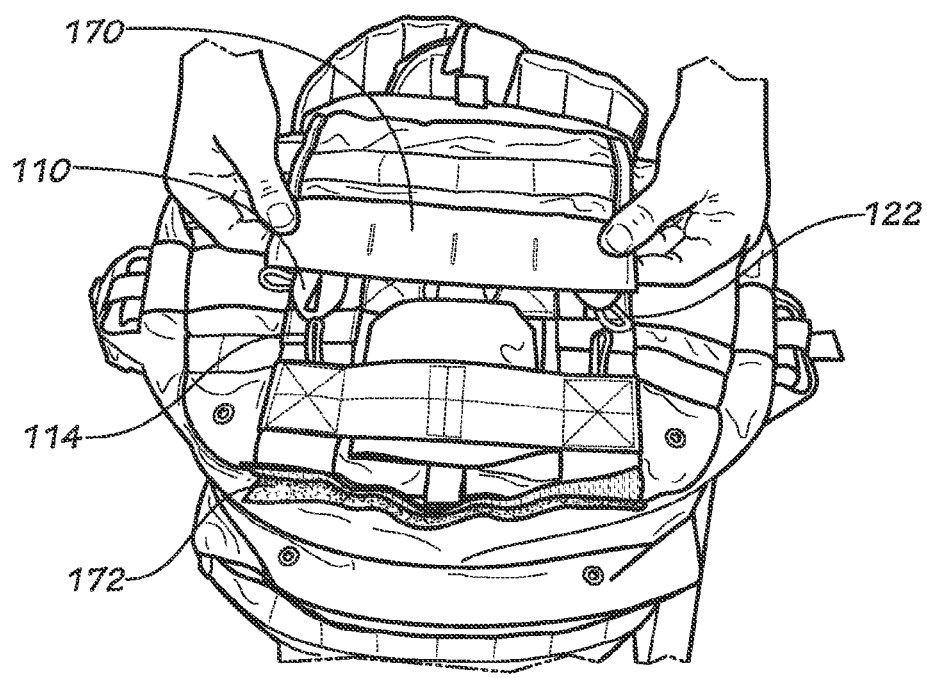
FIG. 4 generally shows a bottom view of a first exemplary embodiment of a jump pack according to this invention, where in the flap is partially withdrawn.
Figure 5:
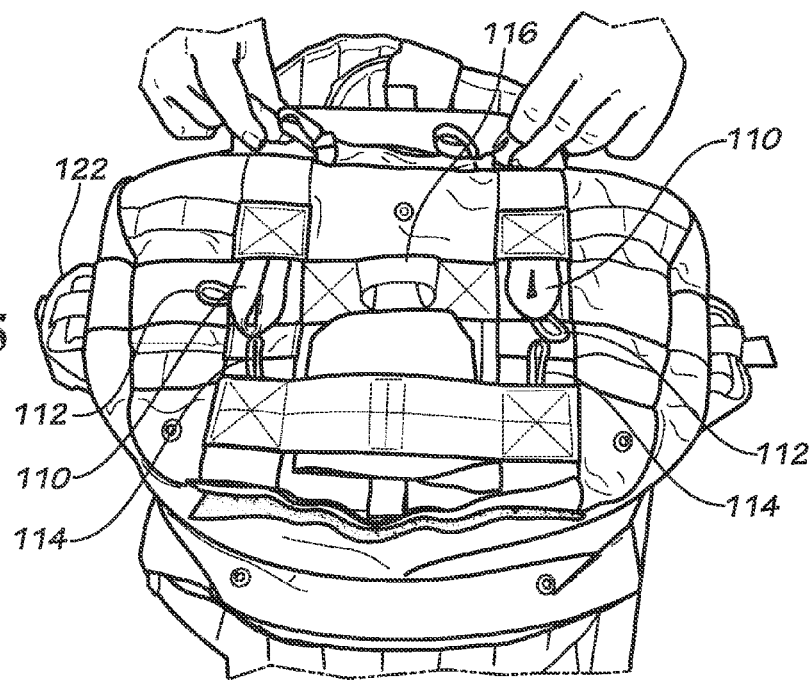
FIG. 5 generally shows a bottom view of a first exemplary embodiment of a jump pack according to this invention, where in the flap is withdrawn.
Figure 6:
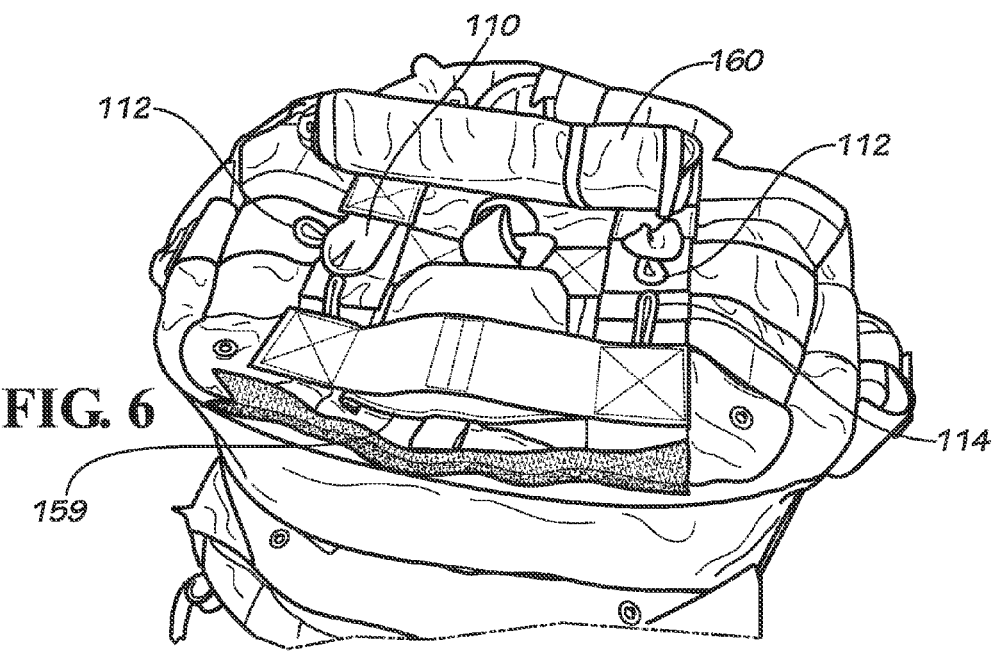
FIG. 6 generally shows a bottom view of a first exemplary embodiment of a jump pack according to this invention, where in the flap is withdrawn and a drop line is attached.
Figure 7:
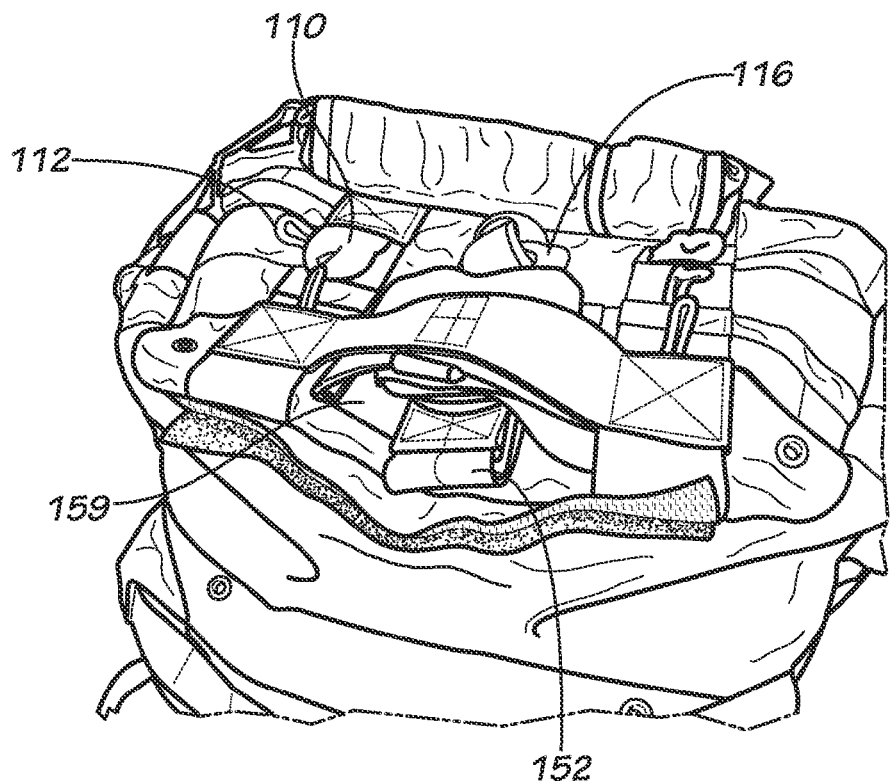
FIG. 7 generally shows a bottom perspective view of a first exemplary embodiment of a jump pack according to this invention, wherein the release assembly is at least partially within the release assembly storage pocket 159.
Figure 8:
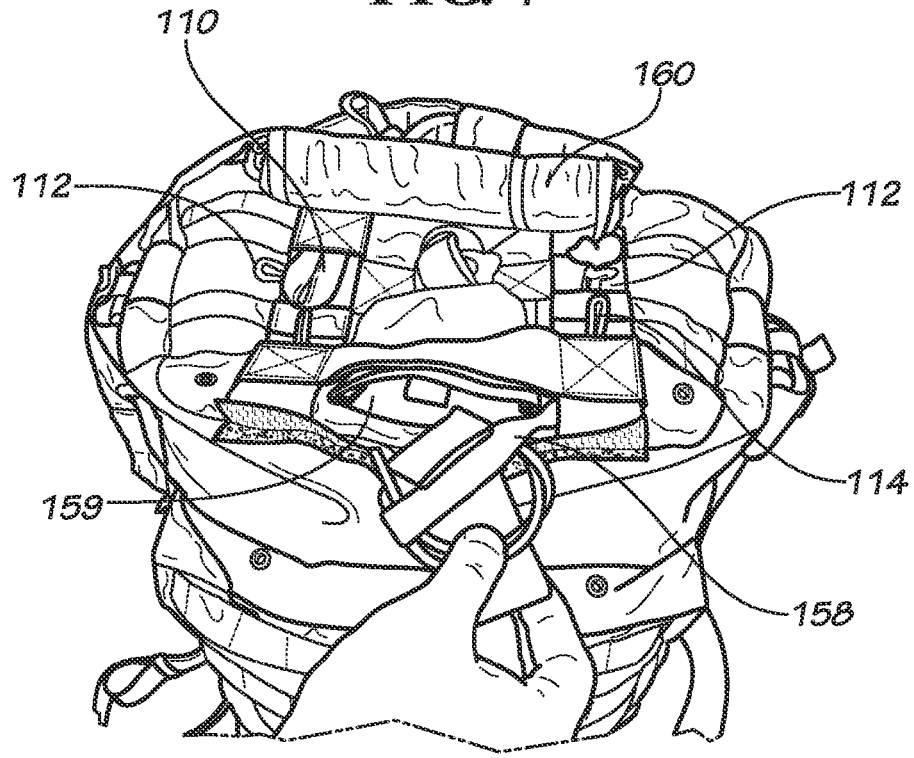
FIG. 8 generally shows a bottom perspective view of a first exemplary embodiment of a jump pack according to this invention, wherein the release assembly is at least partially withdrawn from the release assembly storage pocket 159.

For simplicity and clarification, the design factors and operating principles of the jump pack according to this invention are explained with reference to various exemplary embodiments of a jump pack according to this invention. The basic explanation of the design factors and operating principles of the jump pack is applicable for the understanding, design, and operation of the jump pack of this invention.

Furthermore, it should be appreciated that, for simplicity and clarification, the embodiments of this invention will be described with reference to the jump pack quick-release attachment system of the present invention being utilized with a particular jump pack. However, it should be appreciated that the operating principles of the jump pack quick-release attachment system of this invention may also be employed on a variety of jump packs, backpacks, pouches, or carriers.

It should also be appreciated that the terms "pack", "jumpable pack", and "jump pack" are used for basic explanation and understanding of the operation of the systems, methods, and apparatuses of this invention. Therefore, the terms "pack", "jumpable pack", and "jump pack" are not to be construed as limiting the systems, methods, and apparatuses of this invention.

Turning now to the drawing figures, FIGS. 1-8 show various views of a first exemplary embodiment of a jump pack 100 and its constituent components according to this invention. As illustrated, the jump pack 100 with quick-release attachment system of the present invention comprises at least some of a pack 102 with a quick release attachment area having at least some of harness attachment loops 110, connection loops 112, release loops 114, a drop line attachment loop 116, shoulder straps 140, leg straps 120, leg strap guides 105, leg strap attachment segments 130, and a single point release assembly 150.

The quick-release attachment system is incorporated as part of a jump pack 100. It should be understood that the jump pack 100 may comprise any appropriate pack, pouch, carrier, or backpack. Generally, the jump pack 100 comprises a pack 102 having a bottom portion 103, side portions 104, a front portion 106, a back portion 107, and a top portion 108. Shoulder straps 140 are secured to the jump pack 100, such that the shoulder straps 140 are generally located over the back portion 107 of the jump pack 100. The shoulder straps 140 include an upper adjustment device 142 that allows a user to adjust the length of the shoulder straps 140. The shoulder straps 140 also include a lower adjustment device 144 that allows a user to adjust the length of the shoulder straps 140. Generally, the upper adjustment device 142 allow convenient adjustment of the shoulder straps 140 when the jump pack 100 is worn in an upright position and the lower adjustment device 144 allow a convenient adjustment of the shoulder straps 140 when the jump pack 100 is worn upside down.

As shown in the attached Figs., a matching pair of harness attachment loops 110, connection loops 112, and release loops 114 are secured to the jump pack 100, at spaced apart locations, within a quick release attachment area of the jump pack 100. As illustrated, the quick release attachment area may be located within the bottom portion 103 of the jump pack 100. However, it should be appreciated that the quick release attachment area may be located within any convenient area of the jump pack 100.

A drop line attachment loop 116 is also secured to the quick release attachment area of the jump pack 100. The drop line attachment loop 116 provides a loop to which a drop line 160 is to be attached.

A leg strap 120 is secured to each side portion 104 of the jump pack 100. A leg strap pouch 122 is provided for each leg strap 120, so that when the leg straps 120 are not in use, each leg strap 120 can be secured within a leg strap pouch 122. In various exemplary embodiments, leg strap guides 105 are provided along each side portion 104 of the jump pack 100. The leg strap guides 105 comprise portions of webbing material secured at various intervals along the side portion 104 of the jump pack 100, allow for adjustment of the length and position of the leg straps 120.

Each of the leg strap attachment segments 130 comprises a segment of material having a leg strap attachment segment coupler 138 at one end. The leg strap attachment segment coupler 138 allows the leg strap attachment segment 130 to be releasably, adjustably attached to a leg strap 120. An aperture is formed proximate a second end of each leg strap attachment segment 130. In various exemplary embodiments, the aperture is reinforced by a grommet.

An optional flap 170 is included that can be secured over at least a portion of the quick release attachment area of the jump pack 100, to cover at least some of the harness attachment loops 110, connection loops 112, release loops 114, and drop line attachment loop 116. In various exemplary embodiments, a first side of the flap 170 is attached to the jump pack 100 and a second side of the flap 170 is releasably secured, via a flap fastener 172, to the jump pack 100. In various exemplary embodiments, a flap fastener 172 comprises a portion of a hook or loop fastener, such as Velcro, that is capable of interacting with a corresponding portion of hook or loop fastener on the flap 170. It should be appreciated that, in various exemplary embodiments, the flap fastener 172 may comprise other releasable coupling means or releasable fasteners, such as, for example, male/female snap-release buckles, a ziplock fastening device, a zipper, buttons, snaps, or other fastening, closure, or attachment means known by those skilled in the art.

A flap storage pocket 174 may be included in the jump pack 100, such that the flap 170 can be stored in the flap storage pocket 174, when not in use.

Figures 9, 10:
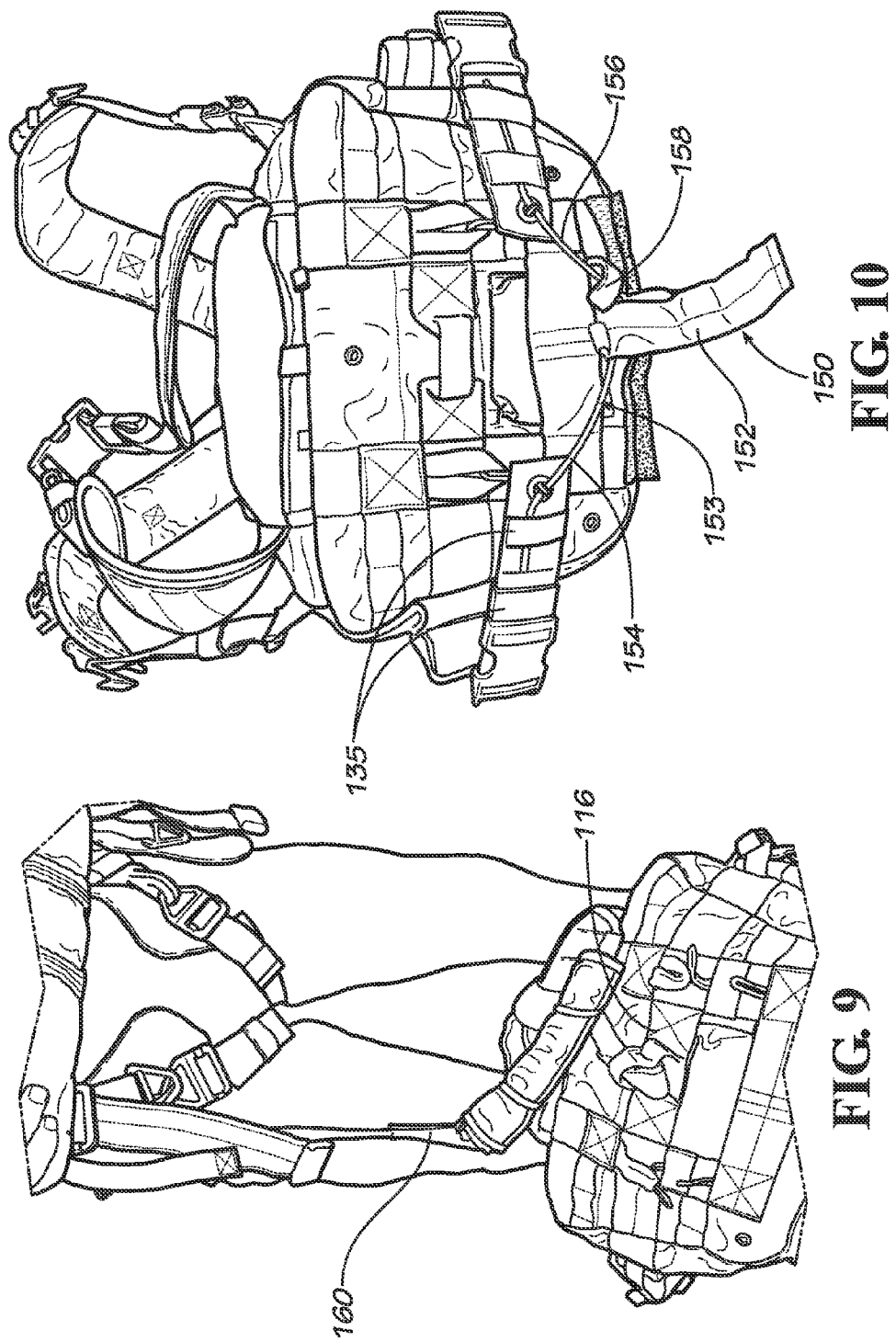
FIG. 9 generally shows a bottom view of a first exemplary embodiment of a jump pack being used in a static line jump configuration according to this invention, where in the flap is withdrawn and a drop line is attached.
FIG. 10 generally shows a bottom view of a first exemplary embodiment of a jump pack being used in a static line jump configuration according to this invention, showing the release assembly.
Figure 11:
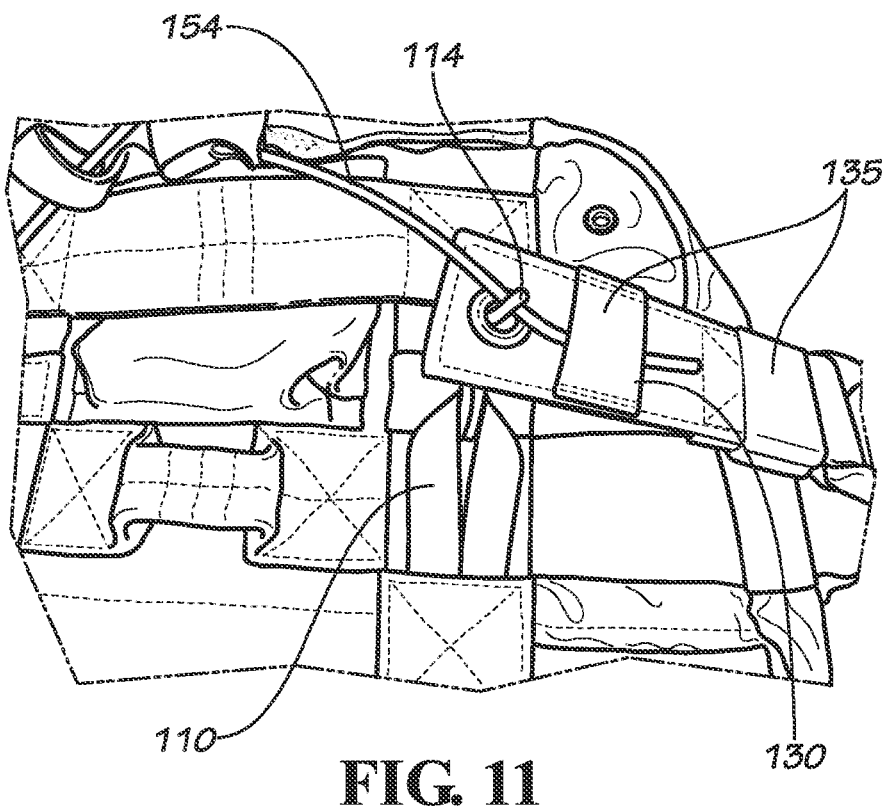
FIG. 11 generally shows a more detailed bottom view of a first exemplary embodiment of a jump pack being used in a static line jump configuration according to this invention, showing a more detailed view of a portion of the release assembly.
Figure 12:
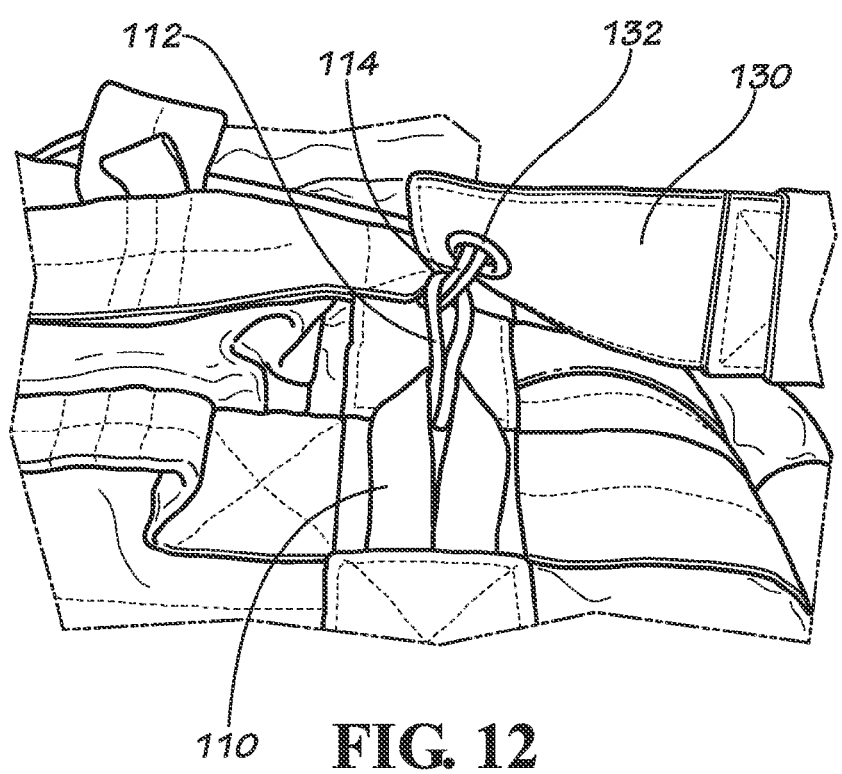
FIG. 12 generally shows a more detailed bottom view of a first exemplary embodiment of a jump pack being used in a static line jump configuration according to this invention, showing a more detailed view of a portion of the release assembly.
Figure 14:
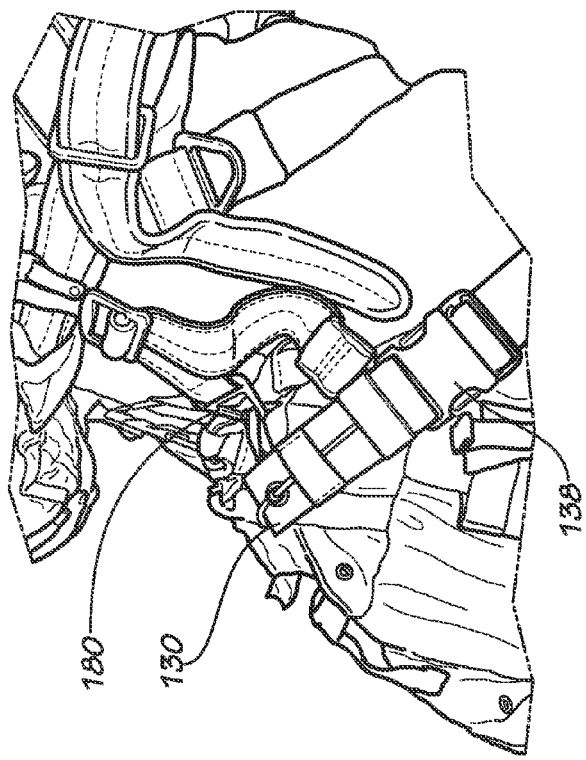
FIG. 14 generally shows a more detailed left side view of a first exemplary embodiment of a jump pack wherein the jump pack is attached to a parachutist and a parachute harness in a static line jump configuration according to this invention.
Figure 13:
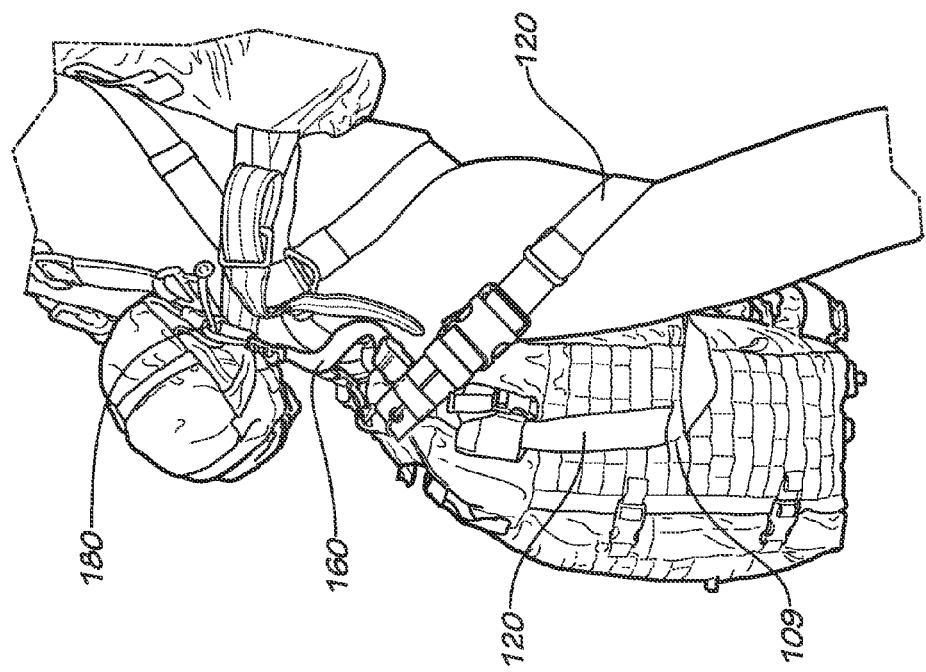
FIG. 13 generally shows a left side view of a first exemplary embodiment of a jump pack wherein the jump pack is attached to a parachutist and a parachute harness in a static line jump configuration according to this invention.
Figure 15:
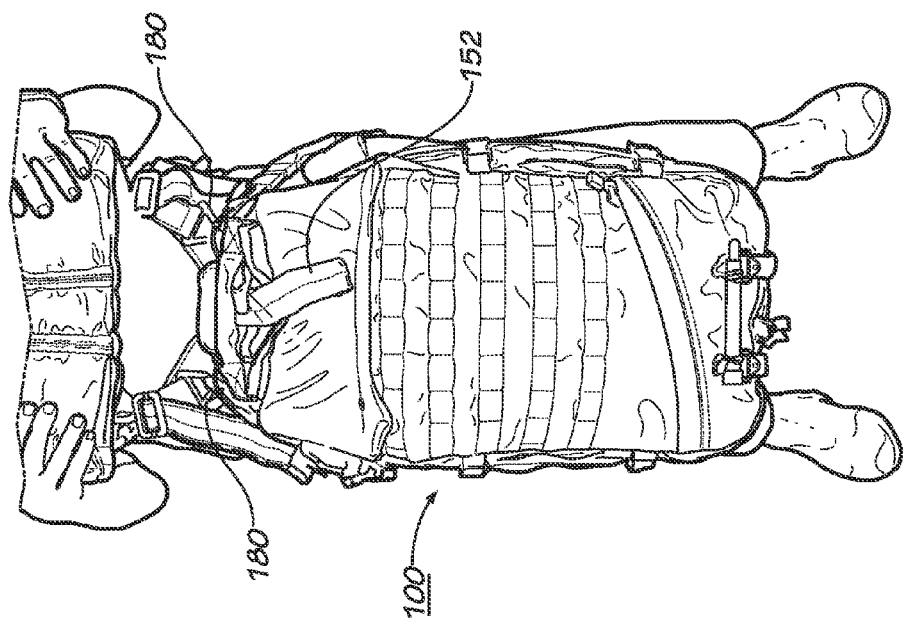
FIG. 15 generally shows a right side view of a first exemplary embodiment of a jump pack wherein the jump pack is attached to a parachutist and a parachute harness in a static line jump configuration according to this invention.
Figure 16:
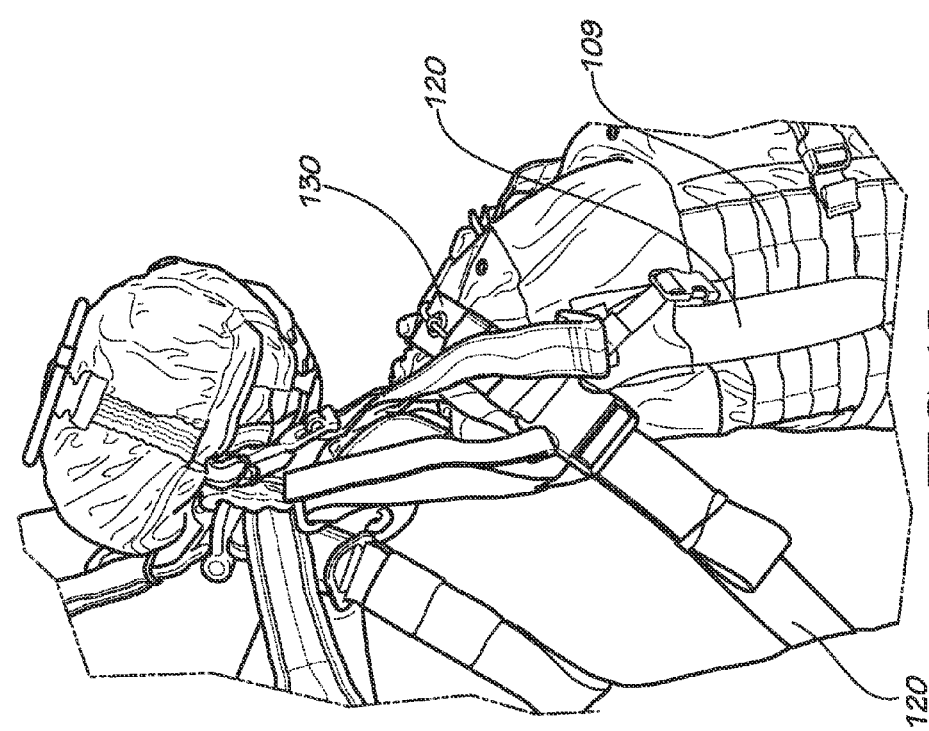
FIG. 16 generally shows a front view of a first exemplary embodiment of a jump pack wherein the jump pack is attached to a parachute harness in a static line jump configuration according to this invention.
Figure 17:
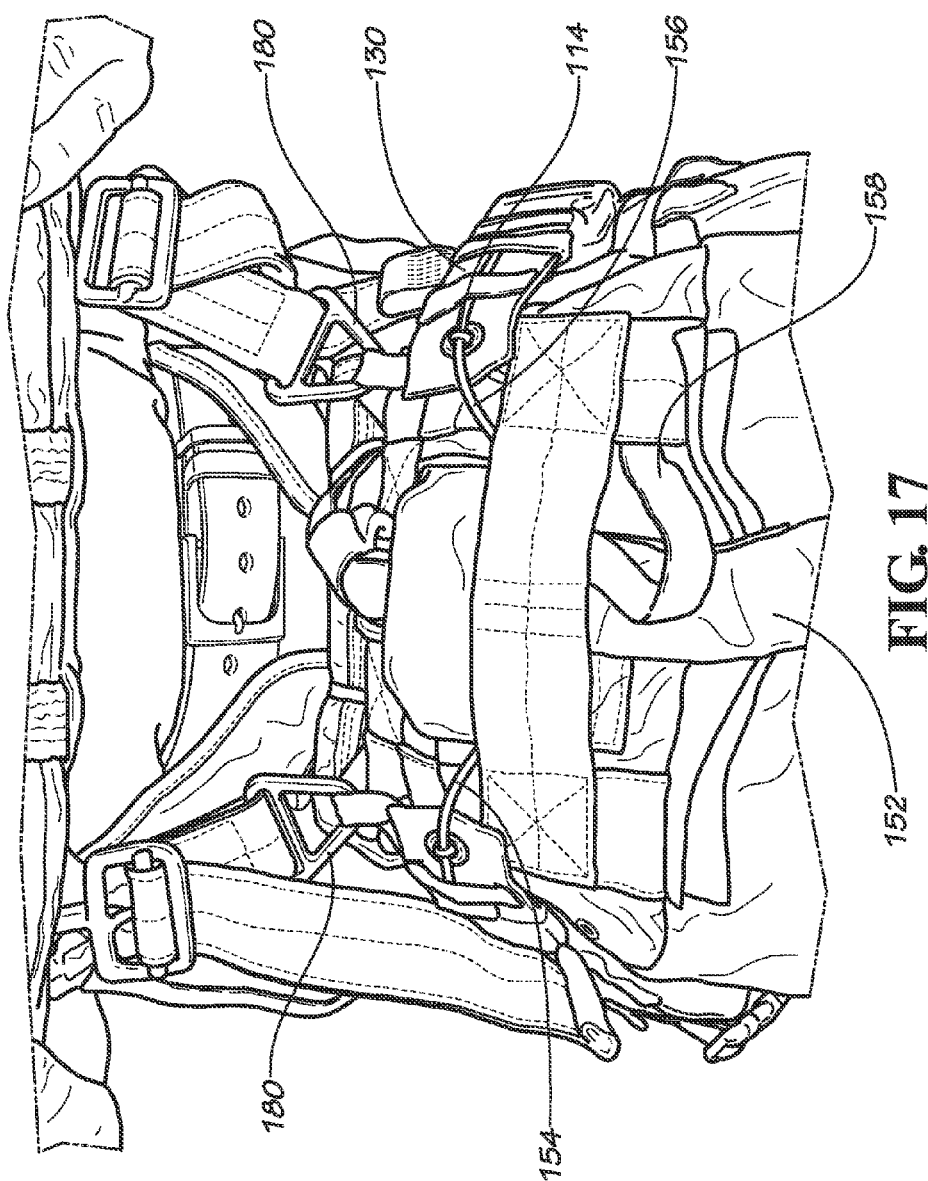
FIG. 17 generally shows a more detailed bottom view of a first exemplary embodiment of a jump pack wherein the jump pack is attached to a parachute harness in a static line jump configuration according to this invention.

The single point release assembly 150 (as shown in FIG. 10) includes a release line 153 attached or coupled to a handle portion 152. As illustrated, the release line 153 extends from a first release line portion 154 to a second release line portion 156. In various exemplary embodiments, the release line 153 is a single, continuous release line and the second release line portion 156 is merely an extension of the first release line portion 154. In other exemplary embodiments, each of the first release line and the second release line are individual release lines attached or coupled to the handle portion 152.

In various exemplary embodiments, the release assembly is tethered to the jump pack 100, via a release assembly tether 158. In this manner, the release assembly cannot be separated from the jump pack 100 and, therefore, cannot be lost.

The release assembly storage pocket 159 may be included in the jump pack 100, and may be formed atop or in a portion of the quick release attachment area of the jump pack 100. The release assembly storage pocket 159 is a position size to allow the release assembly to be stored therein, when not in use.

A plurality of additional accessory attachment loops may optionally be secured to various locations of the jump pack 100. If included, the accessory attachment loops provide a means for attaching various items to the exterior of the jump pack 100.

It should be appreciated that while the quick-release attachment system of the present invention is described and shown as being incorporated into the quick release attachment area within the bottom portion 103 of jump pack 100, the quick-release attachment system and the quick release attachment area of the present invention is not limited to being incorporated into the bottom portion 103 of the jump pack 100, but can be incorporated into any panel or portion of the jump pack 100.

FIGS. 9-19 generally show various views of a first exemplary embodiment of a jump pack 100 and its constituent components being used in a static line jump configuration according to this invention. In a static line application, the jump pack 100 utilizes the harness attachment loops 110, connection loops 112, release loops 114, the drop line attachment loop 116, the leg straps 120, the leg strap guides 105, leg strap attachment segments 130, and the single point release assembly 150 portions of the quick-release attachment system.

As shown in FIGS. 9-19, when the jump pack 100 is to be used during a static line jump, the jump pack 100 is positioned upside down in front of the jumper and a first end of the drop line 160 is attached to the drop line attachment loop 116. A second end of the drop line 160 is attached to the parachute harness 180.

The jump pack 100 is lifted such that each harness attachment loop 110 can be aligned with and passed through an appropriate portion (D-ring) of the parachute harness 180.

When the harness attachment loop 110 has been passed through the parachute harness 180, the connection loop 112 is passed through the portion of the harness attachment loop 110 that protrudes through the parachute harness 180.

When a connection loop 112 has been passed through the harness attachment loop 110, the release loop 114 is passed through the portion of the connection loop 112 that protrudes through the harness attachment loop 110.

The leg straps 120 are routed through an appropriate leg strap guide 109 and through the leg strap attachment segment coupler 138. The leg straps 120 (and a leg strap attachment segments 130) are routed between and around the jumper's legs.

Once the leg straps 120 are routed around the jumper's legs, each release loop 114 is positioned atop the quick release attachment area of the jump pack 100, such that the release loop 114 can be aligned with and passed through the leg strap attachment segment aperture 132.

When the release loop 114 has been passed through the leg strap attachment segment aperture 132, an end of an appropriate first release line portion 154 or second release line portion 156 is passed through the portion of the release loop 114 that protrudes through the leg strap attachment segment aperture 132. The release line portions 154 and 156 can then be passed further through the release loop 114 and through one or more optional release line guides 135 formed in or on the leg strap attachment segments 130.

It should be understood that these steps are repeated as a leg strap 120 is positioned around each of the jumper's legs.

When the release line portions 154 and 156 have been routed through the release loops 114, the handle portion 152 of the single point release assembly 150 can be releasably secured, via, for example, Velcro, to the quick release attachment area of the jump pack 100.

Once the release line portions 154 and 156 are routed through the release loops 114, as described above, the jump pack 100 is releasably secured to the jumper's parachute harness 180, via the quick-release attachment system of the present invention.

It should be appreciated that the length of the leg straps 120 can be adjusted, via the leg strap attachment segment coupler 138 so that the jumper is able to achieve the best fit of the jump pack 100 to the parachute harness 180 and the jumper's body.

Figure 19:
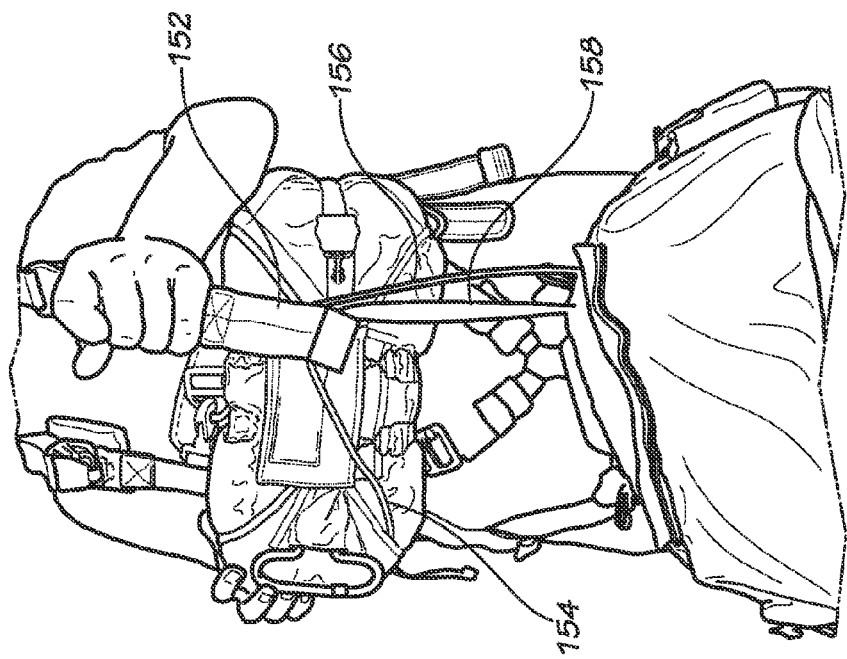
FIG. 19 generally shows a more detailed bottom view of a first exemplary embodiment of a jump pack being used in a static line jump configuration according to this invention, showing the release assembly in a release position.
Figure 18:
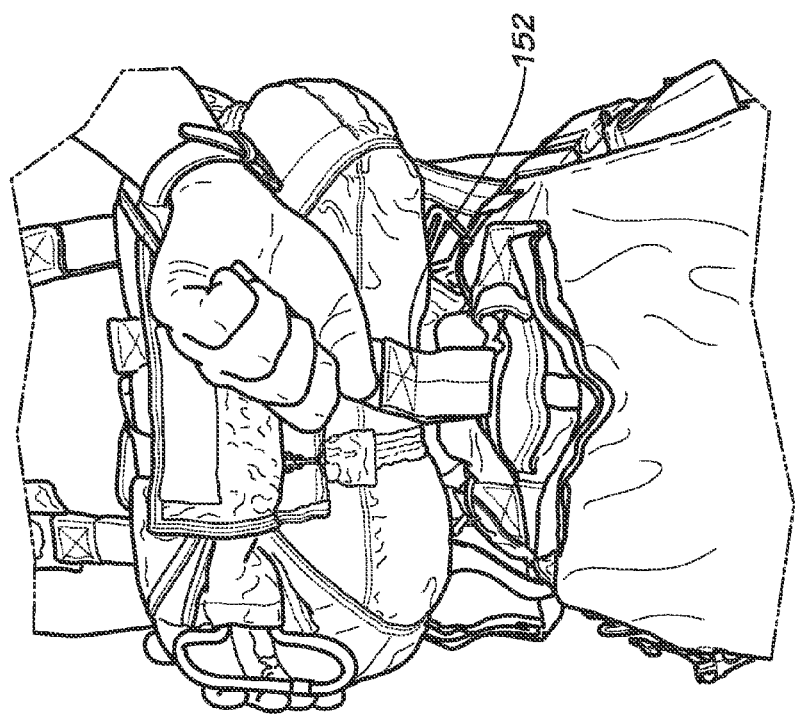
FIG. 18 generally shows a more detailed front view of a first exemplary embodiment of a jump pack being used in a static line jump configuration according to this invention, showing a more detailed view of a portion of the release assembly.
Figure 21:
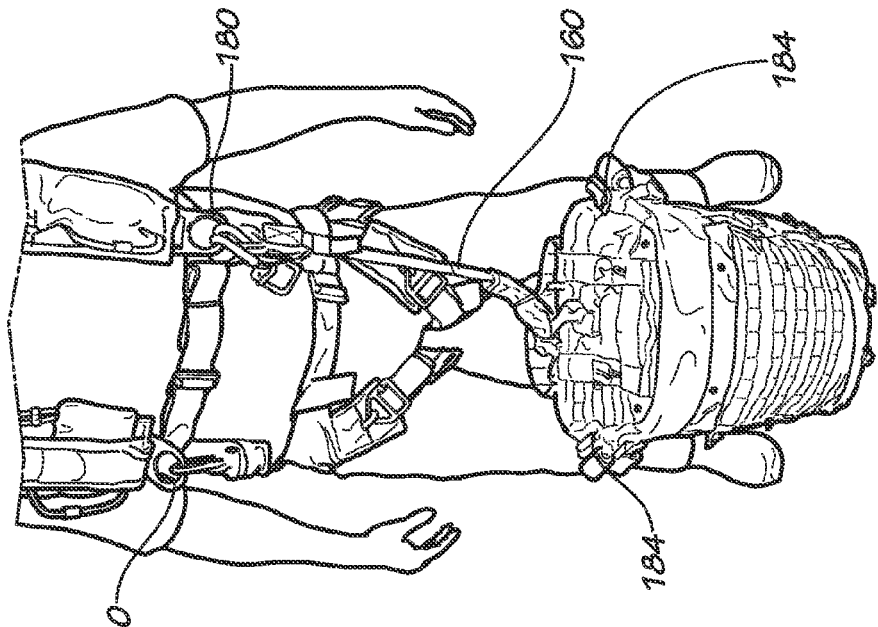
FIG. 21 generally shows a bottom perspective view of a first exemplary embodiment of a jump pack being used in a first freefall jump configuration according to this invention, where in the drop line is attached to the parachute harness.
Figure 20:
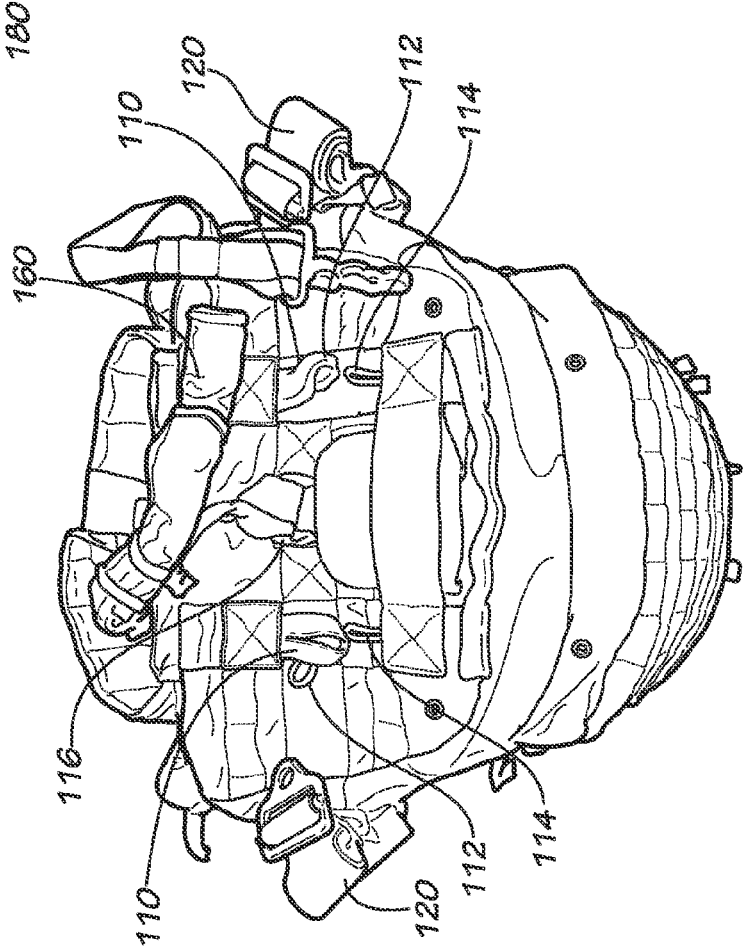
FIG. 20 generally shows a bottom perspective view of a first exemplary embodiment of a jump pack being used in a first freefall jump configuration according to this invention, where in the flap is withdrawn and a drop line is attached.
Figure 22:
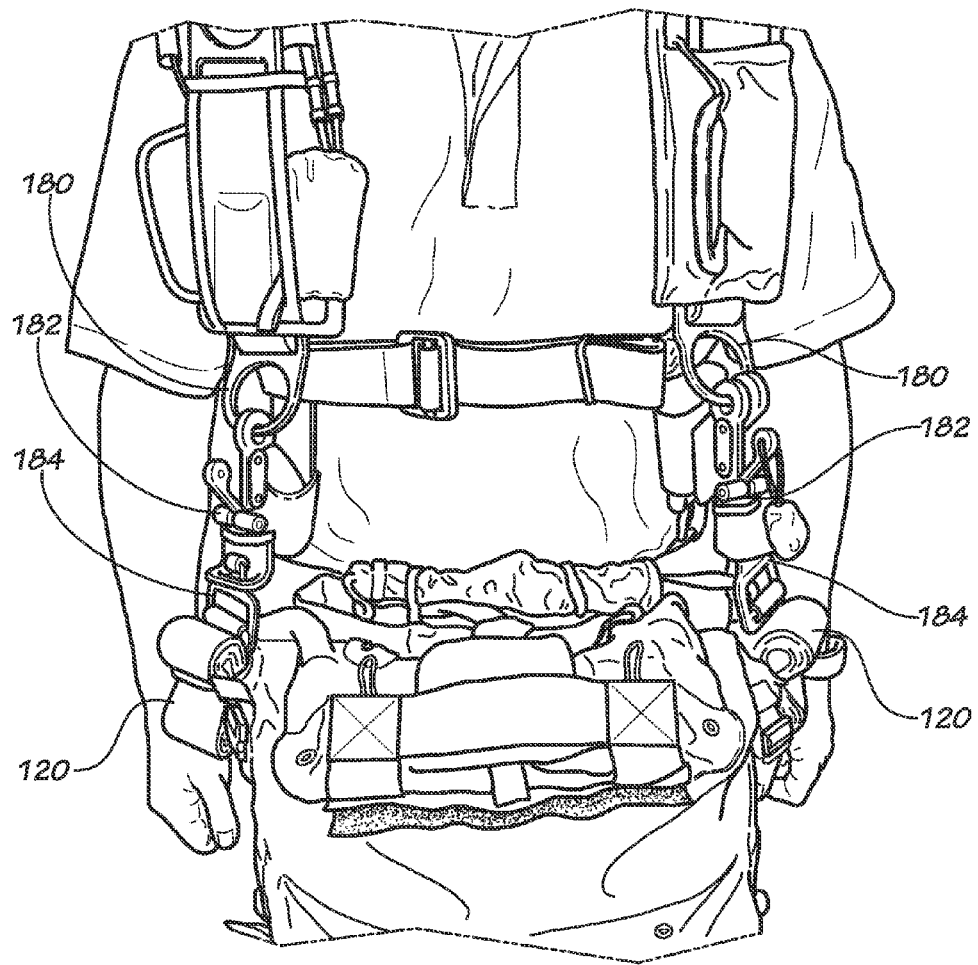
FIG. 22 generally shows a bottom perspective view of a first exemplary embodiment of a jump pack being used in a first freefall jump configuration according to this invention, where in the jump pack is attached to the parachute harness.
Figure 24:
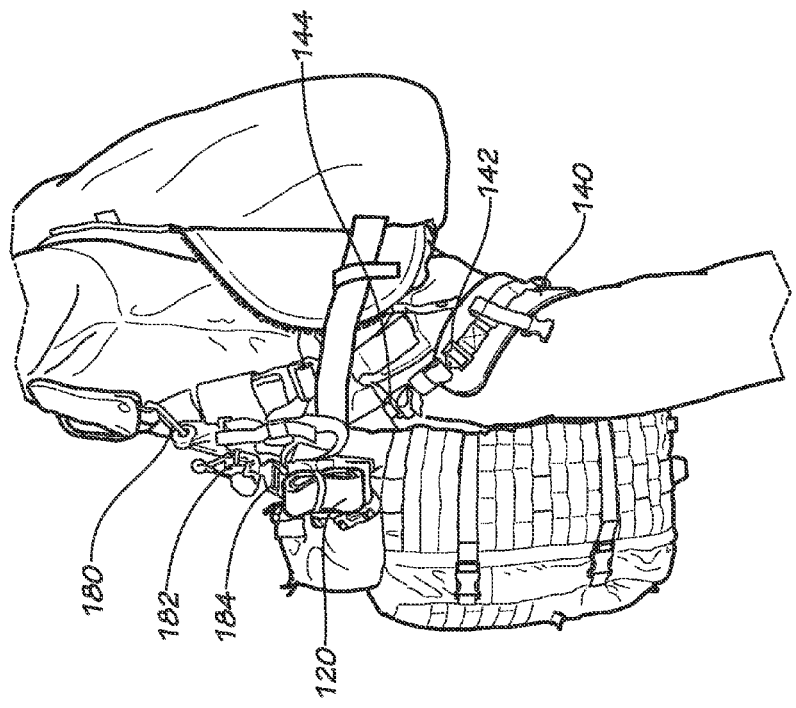
FIG. 24 generally shows a left side view of a first exemplary embodiment of a jump pack being used in a first freefall jump configuration according to this invention, where in the jump pack is attached to the parachute harness.
Figure 23:
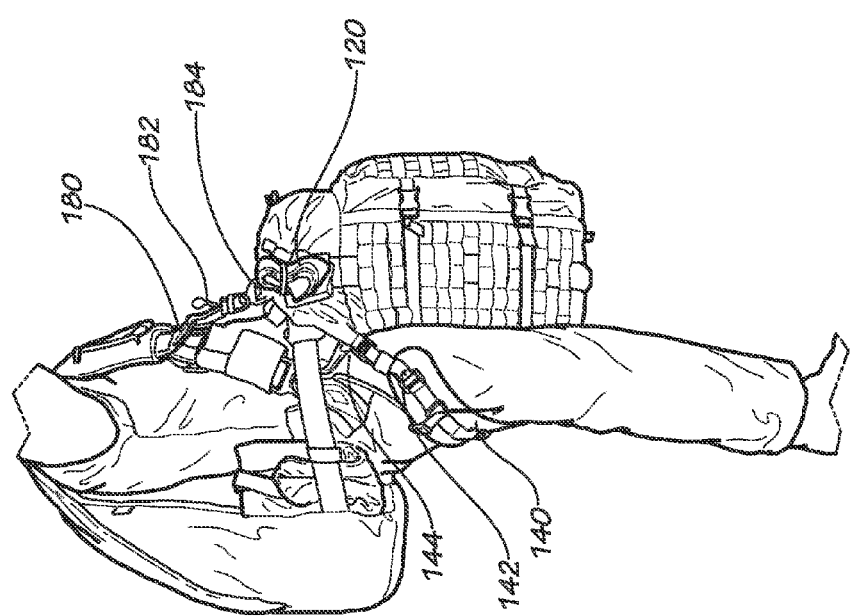
FIG. 23 generally shows a right side view of a first exemplary embodiment of a jump pack being used in a first freefall jump configuration according to this invention, where in the jump pack is attached to the parachute harness.

When the jumper jumps, as the jumper approaches the ground, the jump pack 100 can be released from the parachute harness 180 by the jumper pulling the handle portion 152 of the single point release assembly 150, as shown in FIGS. 18 and 19.

When the handle portion 152 is pulled a sufficient distance, the release line portions 154 and 156 are slidably withdrawn from the release loops 114, allowing the release loops 114 to be freely withdrawn from the leg strap attachment segment apertures 132 and the connection loops 112.

When the release loops 114 are withdrawn from the apertures and the connection loops 112, the leg strap attachment segments 130 are released from the quick release attachment area of the jump pack 100 and the connection loops 112 can freely be withdrawn from the harness attachment loops 110.

When a connection loops 112 are withdrawn from the harness attachment loops 110, the harness attachment loops 110 can be freely withdrawn from the parachute harness 180 as the jump pack 100 can drop away from the jumper's body.

As the jump pack 100 drops away from the jumper's body, the drop line 160 is withdrawn from any jump line sheath or covering and is able to fully extend. When the drop line 160 reaches its full extension, the connection between the parachute harness 180 and the drop line attachment loop 116 of the jump pack 100 maintains a connection between the jump pack 100 and the parachute harness 180, allowing the jump pack 100 to be suspended below the jumper.

When the jumper reaches the ground, the drop line 160 can be released from the drop line attachment loop 116, the single point release assembly 150 can be stowed in the release assembly storage pocket 159, and the flap 170 can be removed from the flap storage pocket 174 and secured, by the flap fastener 172, so as to cover at least certain of the quick-release attachment system components on the quick release attachment area of the jump pack 100. Each leg strap 120 can be removed from its respective leg strap attachment segment coupler 138 and positioned within its respective leg strap pouch 122.

FIGS. 20-24 generally show various views of a first exemplary embodiment of a jump pack 100 and its constituent components being used in a first freefall jump configuration according to this invention. In a freefall application, the jump pack 100 utilizes the harness attachment loops 110, connection loops 112, release loops 114, the drop line attachment loop 116, the shoulder straps 140, the leg straps 120, the leg strap guides 105, the leg strap attachment segments 130, and the single point release assembly 150 portions of the quick-release attachment system.

As shown in FIGS. 20-24, when the jump pack 100 is to be used in the first exemplary freefall configuration, each of the leg straps 120 is routed through an appropriate quick release buckle 184.

To don the jump pack 100, the jump pack 100 may optionally be positioned upside down in front of the jumper and a first end of the drop line 160 is attached to the drop line attachment loop 116. A second end of the drop line 160 is attached to the parachute harness 180.

The jumper then steps into the shoulder straps 140 of the jump pack 100 and raises the jump pack 100 such that the quick release buckles 184 attached to the leg straps 120 can be buckled into an appropriate quick release harness 182 of the parachute harness 180.

Once the quick release buckles 184 are buckled into the appropriate quick releases, the jump pack 100 is releasably secured to the jumper's parachute harness 180, via the quick-release attachment system of the present invention.

It should be appreciated that the length of the shoulder straps 140 can be adjusted, via the lower adjustment device 144 so that the jumper is able to achieve the best fit of the jump pack 100 to the parachute harness 180 and the jumper's body.

When the jumper jumps, as the jumper approaches the ground, the jump pack 100 can be released from the parachute harness 180 by the jumper manipulating the quick release mechanisms and releasing the quick release buckles 184.

When the quick release buckles 184 are released, the jump pack 100 can drop away from the jumper's body.

As the jump pack 100 drops away from the jumper's body, the drop line 160 is withdrawn from any jump line sheath or covering and is able to fully extend. When the drop line 160 reaches its full extension, the connection between the parachute harness 180 and the drop line attachment loop 116 of the jump pack 100 maintains a connection between the jump pack 100 and the parachute harness 180, allowing the jump pack 100 to be suspended below the jumper.

When the jumper reaches the ground, the drop line 160 can be released from the drop line attachment loop 116 and the flap 170 can be removed from the flap storage pocket 174 and secured, by the flap fastener 172, so as to cover at least certain of the quick-release attachment system components on the quick release attachment area of the jump pack 100. Each leg strap 120 can be removed from its respective leg strap attachment segment coupler 138 and positioned within its respective leg strap pouch 122.

Figure 27:
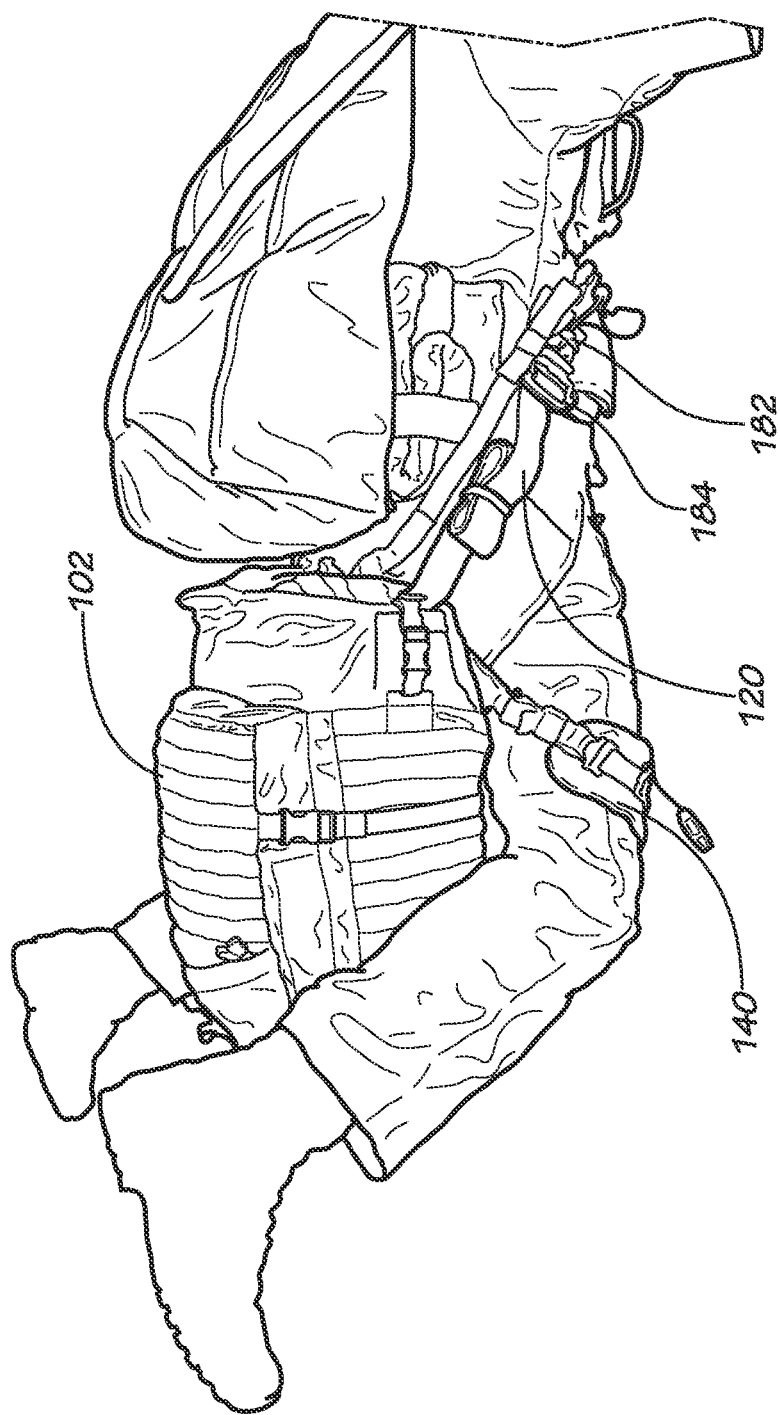
FIG. 27 generally shows a right side perspective view of a first exemplary embodiment of a jump pack being used in a second freefall jump configuration according to this invention, where in the jump pack is attached to the parachutist and the parachute harness.

FIGS. 25-27 generally show various views of a first exemplary embodiment of a jump pack 100 and its constituent components being used in a second freefall jump configuration according to this invention.

As shown in FIGS. 25-27, when the jump pack 100 is to be used in a second exemplary freefall configuration, each of the leg straps 120 is routed through an appropriate quick release buckle 184.

To don the jump pack 100, the jump pack 100 may optionally be positioned upside down behind the jumper and a first end of the drop line 160 is attached to the drop line attachment loop 116. A second end of the drop line 160 is attached to the parachute harness 180.

The jumper then steps backwards, into the shoulder straps 140 of the jump pack 100 and raises the jump pack 100 such that the quick release buckles 184 attached to the leg straps 120 can be buckled into an appropriate quick release harness 182 of the parachute harness 180.

Once the quick release buckles 184 are buckled into the appropriate quick releases, the jump pack 100 is releasably secured to the jumper's parachute harness 180, via the quick-release attachment system of the present invention.

It should be appreciated that the length of the shoulder straps 140 can be adjusted, via the lower adjustment device 144 so that the jumper is able to achieve the best fit of the jump pack 100 to the parachute harness 180 and the jumper's body.

When the jumper jumps, the jump pack 100 is released in a manner similar to that described above, with respect to the first exemplary freefall configuration. However, it should be understood that in the first freefall configuration, the jump pack 100 is positioned substantially in front of the jumper, while in the second freefall configuration, the jump pack 100 is positioned substantially behind the jumper.

While this invention has been described in conjunction with the exemplary embodiments outlined above, it is evident that many alternatives, modifications, and variations will be apparent to those skilled in the art. Such adaptations and modifications should and are intended to be comprehended within the meaning and range of equivalents of the disclosed exemplary embodiments. It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A jumpable pack, comprising:
   a pack;
   a pair of harness attachment loops, wherein said harness attachment loops are secured, at spaced apart locations, directly to said pack;
   a pair of connection loops, wherein said connection loops are secured, at spaced apart locations, directly to said pack, such that each harness attachment loop interacts with a corresponding connection loop;
   a pair of release loops, wherein said release loops are secured, at spaced apart locations, directly to said pack, such that each release loop interacts with a corresponding connection loop;
   a pair of shoulder straps releasably secured to said pack;
   a pair of leg straps, wherein each leg strap is secured to said pack;
   a pair of leg strap attachment segments, wherein each leg strap attachment segment is releasably secured, via a leg strap attachment segment coupler, to each leg strap, and wherein each leg strap attachment segment includes an aperture formed proximate an end of said leg strap attachment segment;
   a single point release assembly, wherein said single point release assembly includes a release line attached to a handle portion; and
   wherein at least a portion of said corresponding connection loop is capable of being passed through a portion of said harness attachment loop, at least a portion of said release loop is capable of being passed through a portion of said corresponding connection loop that extends through said harness attachment loop, and at least a portion of said release line is capable of being passed through a portion of said release loop that extends through said corresponding connection loop to releasably secure at least a portion of one of said harness attachment loops to a corresponding connection loop.

2. The jumpable pack of claim 1, wherein said release line is attached to said handle portion between a first release line portion and a second release line portion.

3. The jumpable pack of claim 2, wherein said first release line and said second release line are individual release lines attached to said handle portion.

4. The jumpable pack of claim 1, wherein said pair of harness attachment loops, said pair of connection loops, and said pair of release loops are secured to a bottom portion of said pack.

5. The jumpable pack of claim 1, wherein said shoulder straps include an upper adjustment device and a lower adjustment device.

6. The jumpable pack of claim 1, wherein at least a portion of said corresponding connection loop is capable of being passed through a portion of said harness attachment loop, at least a portion of said release loop is capable of being passed through a portion of said corresponding connection loop that extends through said harness attachment loop and at least a portion of said release loop that extends through said corresponding connection loop is capable of being passed through said aperture of said leg strap attachment segment, and at least a portion of said release line is capable of being passed through a portion of said release loop that extends through said aperture of said leg strap attachment segment to releasably secure at least one of said leg strap attachment segments to one of said release loops.

7. The jumpable pack of claim 1, further comprising a flap that can be secured over at least a portion of said pack to cover at least some of said harness attachment loops, said connection loops, said release loops, and said drop line attachment loop.

8. A jumpable pack, comprising:
   a pack;
   a pair of harness attachment loops, wherein said harness attachment loops are secured, at spaced apart locations, directly to said pack;
   a pair of connection loops, wherein said connection loops are secured, at spaced apart locations, directly to said pack, such that each harness attachment loop interacts directly with a corresponding connection loop;
   a pair of release loops, wherein said release loops are secured, at spaced apart locations, directly to said pack, such that each release loop interacts directly with a corresponding connection loop;
   a drop line attachment loop, wherein said drop line attachment loop is secured directly to said pack;
   a pair of shoulder straps releasably secured to said pack;
   a pair of leg straps, wherein each leg strap is secured to a side portion of said pack;
   a pair of leg strap attachment segments, wherein each leg strap attachment segment is releasably secured, via a leg strap attachment segment coupler, to each leg strap, and wherein each leg strap attachment segment includes an aperture formed proximate an end of said leg strap attachment segment;
   a single point release assembly, wherein said single point release assembly includes a release line attached to a handle portion; and
   wherein each of said release loops is positioned so as to be at least partially disposed within a corresponding one of said connection loops and wherein said corresponding one of said connection loops is positioned so as to be at least partially disposed within a corresponding one of said harness attachment loops.

9. The jumpable pack of claim 8, wherein said release line is attached to said handle portion between a first release line portion and a second release line portion.

10. The jumpable pack of claim 9, wherein said release line is a single, continuous release line that extends from said first release line portion to said second release line portion.

11. The jumpable pack of claim 9, wherein said first release line and said second release line are individual release lines attached to said handle portion.

12. The jumpable pack of claim 8, further comprising a flap that can be secured over at least a portion of said pack to cover at least some of said harness attachment loops, said connection loops, said release loops, and said drop line attachment loop.

13. The jumpable pack of claim 12, further comprising a flap storage pocket such that said flap can be stored within said flap storage pocket.

14. The jumpable pack of claim 8, wherein said pair of harness attachment loops, said pair of connection loops, and said pair of release loops are secured to a bottom portion of said pack.

15. The jumpable pack of claim 8, wherein said shoulder straps include an upper adjustment device and a lower adjustment device.

16. The jumpable pack of claim 8, further comprising a leg strap pouch provided for each leg strap.

17. The jumpable pack of claim 8, wherein at least a portion of one of said harness attachment loops is releasably secured to a corresponding connection loop when at least a portion of said corresponding connection loop is passed through a portion of said harness attachment loop, at least a portion of said release loop is passed through a portion of said corresponding connection loop that extends through said harness attachment loop, and at least a portion of said release line is passed through a portion of said release loop that extends through said corresponding connection loop.

18. The jumpable pack of claim 8, wherein at least one of said leg strap attachment segments is releasably secured to one of said release loops when at least a portion of said corresponding connection loop is passed through a portion of said harness attachment loop, at least a portion of said release loop is passed through a portion of said corresponding connection loop that extends through said harness attachment loop and at least a portion of said release loop that extends through said corresponding connection loop is passed through said aperture of said leg strap attachment segment, and at least a portion of said release line is passed through a portion of said release loop that extends through said aperture of said leg strap attachment segment.

19. The jumpable pack of claim 8, wherein said release assembly is tethered, via a release assembly tether, to said pack.

20. The jumpable pack of claim 8, further comprising a release assembly storage pocket formed in a portion of said pack such that said release assembly can be stored within said release assembly storage pocket.

\* \* \* \* \*